United States Patent [19]

Harris et al.

[11] Patent Number: 5,051,637
[45] Date of Patent: Sep. 24, 1991

[54] FLUX CONTROL TECHNIQUES FOR MAGNETIC BEARING

[75] Inventors: Tim Harris; Gordon Brailean; Theodor Bardas; Cal Oleksuk, all of Calgary; Vaclav Kulle, Blind Bay, all of Canada

[73] Assignee: Nova Corporation of Alberta, Calgary, Canada

[21] Appl. No.: 495,913

[22] Filed: Mar. 20, 1990

[51] Int. Cl.$^5$ .......................... H02K 1/14; F16C 32/04
[52] U.S. Cl. ..................................... 310/90.5; 310/256
[58] Field of Search ...................... 310/90.5, 254, 256

[56] References Cited

U.S. PATENT DOCUMENTS

| 2,746,671 | 5/1956 | Newcomb . | |
| 2,822,694 | 2/1958 | McKenney . | |
| 2,966,296 | 12/1960 | Morley et al. . | |
| 3,512,852 | 5/1970 | North | 310/90.5 |
| 3,558,238 | 1/1971 | Van Herpt . | |
| 3,591,819 | 3/1971 | Laing | 310/259 |
| 3,731,984 | 5/1973 | Habermann | 310/90.5 |
| 3,747,998 | 7/1973 | Klein et al. | 310/90.5 |
| 3,758,226 | 9/1973 | Gyurech . | |
| 3,822,102 | 7/1974 | Erickson et al. . | |
| 3,999,882 | 12/1976 | Purton . | |
| 4,255,684 | 3/1981 | Mischler et al. | 310/254 |
| 4,413,946 | 11/1983 | Marshall et al. . | |
| 4,472,107 | 9/1984 | Chang et al. . | |
| 4,523,896 | 6/1985 | Lhenry et al. . | |
| 4,557,664 | 12/1985 | Tuttle et al. . | |
| 4,578,018 | 3/1986 | Pope . | |
| 4,697,981 | 10/1987 | Brown et al. . | |
| 4,973,870 | 11/1990 | Uehara | 310/256 |

FOREIGN PATENT DOCUMENTS

| 192545 | 9/1919 | Canada . | |
| 192628 | 9/1919 | Canada . | |
| 1063364 | 10/1979 | Canada . | |
| 1082150 | 7/1980 | Canada . | |
| 223203 | 6/1985 | German Democratic Rep. | 310/90.5 |
| 58-34226 | 2/1983 | Japan | 310/90.5 |

Primary Examiner—Steven L. Stephan
Assistant Examiner—D. L. Rebsch
Attorney, Agent, or Firm—Stevens, Davis, Miller & Mosher

[57] ABSTRACT

A magnetic bearing has a number of pole pieces disposed about the circumference of the shaft supported by the bearing. To inhibit magnetic flux migration within the bearing, magnetic barriers of non-magnetic material are interposed between pole pieces at selected locations. Magnetic guides prevent magnetic saturation of the bridging portion of the pole pieces prior to the poles' saturating.

19 Claims, 5 Drawing Sheets

LEGEND

HIGH DENSITY

MEDIUM DENSITY

LOW DENSITY

LEGEND

HIGH DENSITY

MEDIUM DENSITY

LOW DENSITY

FLUX CONTROL TECHNIQUES FOR MAGNETIC BEARING

The present invention relates to magnetic bearings.

A magnetic bearing is utilized to support a rotating shaft and to maintain the position of such a shaft relative to a datum. The bearings consist of a stator assembly and a rotor assembly fixed to the shaft with one of the assemblies, usually the stator, having a number of pole pieces arranged around the circumference of the shaft. Coils are associated with the pole pieces to generate in the pole pieces a magnetic flux that extends across an air gap between the stator and rotor and produces a magnetic force to support the shaft. The current supply to the coils can be controlled to maintain the position of the shaft at the desired position. The ability of the bearing to support the shaft depends upon the flux density in the air gap.

In many applications, the shaft is subjected to an unequal loading in one predominant direction either due to the shaft lying in a horizontal plane or because of the nature of the loads carried by the shaft. This unequal load is compensated in the bearing by increasing the magnetic flux in the pole pieces aligned with the predominant direction of the force. Thus, in the case of a bearing that is supporting a horizontal shaft, the coils associated with the pole pieces vertically above the shaft will be supplied with a greater current than those immediately below the shaft to compensate for the gravitational forces applied to the shaft.

It will be apparent that the magnetic flux densities vary around the shaft from pole piece to pole piece which results in a tendency for flux to migrate from areas of high flux density to areas of low flux density. The migration of flux results in stray flux travelling through the rotor and stator assemblies and, if the flux crosses the air gap at a location opposite to the line of action of the offset force, the bearing capacity is reduced. Thus in the case of a bearing supporting a horizontal shaft, stray flux migrating from the top half of the bearing and crossing the air gap below the horizontal center line of the bearing reduces the ability of the bearing to withstand vertical loads. The stray flux in typical bearings may be sufficient to reduce the bearing load capacity by several percent, requiring an increased bearing size which is generally undesirable.

The migrating stray flux may also flow through the rotor in such a manner that it increases the flux density in the pole pieces subjected to maximum magnetomotive force which results in localized saturation in the pole pieces. This reduces the magnetic flux flowing in the primary circuit established through the pole and rotor and so reduces the flux density in the air gap.

It is therefore an object of the present invention to provide a magnetic bearing in which one or more of the above disadvantages are obviated or mitigated.

According to the present invention, there is provided a magnetic bearing comprising a stator assembly and a rotor assembly separated by an air gap, one of said assemblies having a plurality of pole pieces each having a pair of poles and arranged about the axis of rotation of said rotor assembly, coil means associated with the pole pieces to generate a magnetic flux in said pole pieces and establish a magnetic circuit through said pole pieces between said rotor and stator assemblies, at least one insert of non-magnetic material being interposed between a pair of adjacent pole pieces thereby to inhibit migration of flux between said pole pieces.

Preferably a plurality of inserts are provided to divide the pole pieces into a plurality of sets. As a further preference, the inserts are uniformly distributed about the axis of rotation, and, as a yet further preference, are diametrically opposed.

The pole pieces may be individually formed and abut adjacent ones in the same set, the inserts then being interposed between adjacent pole pieces of different sets.

The non-magnetic inserts interrupt the stray flux and inhibit migration of flux within the assemblies.

According also to the present invention, there is provided a magnetic bearing comprising a stator assembly and a rotor assembly separated by an air gap, one of said assemblies having a plurality of discrete pole pieces arranged about the axis of rotation of said rotor assembly and each of which has a pair of poles located adjacent said air gap, coil means associated with the pole pieces to generate a magnetic flux in said pole pieces and establish a primary magnetic circuit through said pole pieces and between said rotor and stator assemblies, and magnetic guides extending partially around the periphery of said pole pieces at a location remote from said poles, said guide increasing the area of the magnetic path at said location to inhibit the saturation of said pole piece at said location by said magnetic flux.

Preferably the pole pieces are generally pie-shaped and the magnetic guide extends between a plurality of the pole pieces and conforms to the periphery thereof.

An embodiment of the invention will now be described by way of example only with reference to the accompanying drawings in which FIG. 1 is a sectional view of a magnetic bearing;

FIG. 4a shows the flux density distribution resulting from the embodiment of FIGS. 1-3 and FIG. 4b shows the resulting flux density distribution paths with part of the structure omitted.

Figure 1:
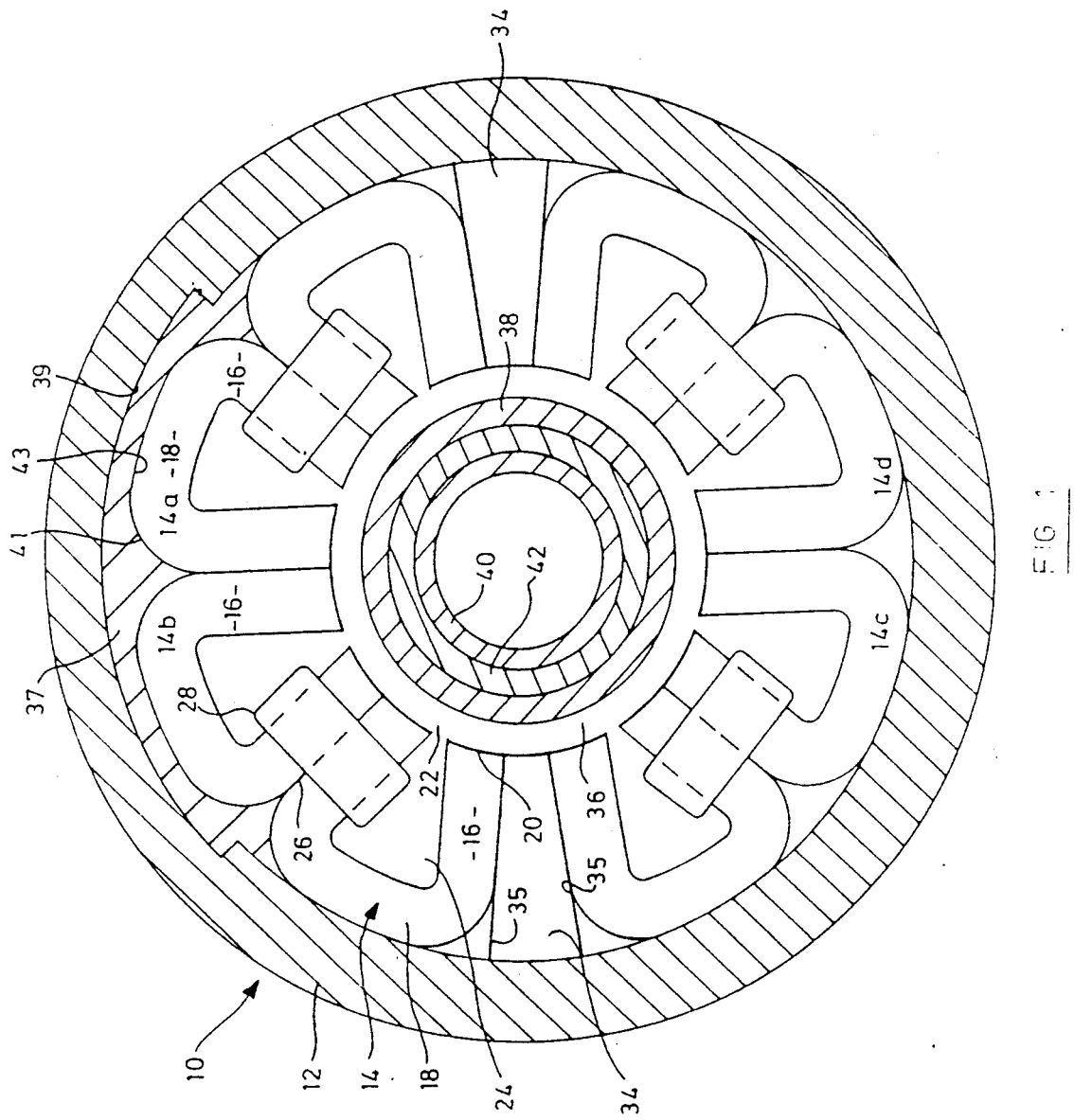
Figure 2:
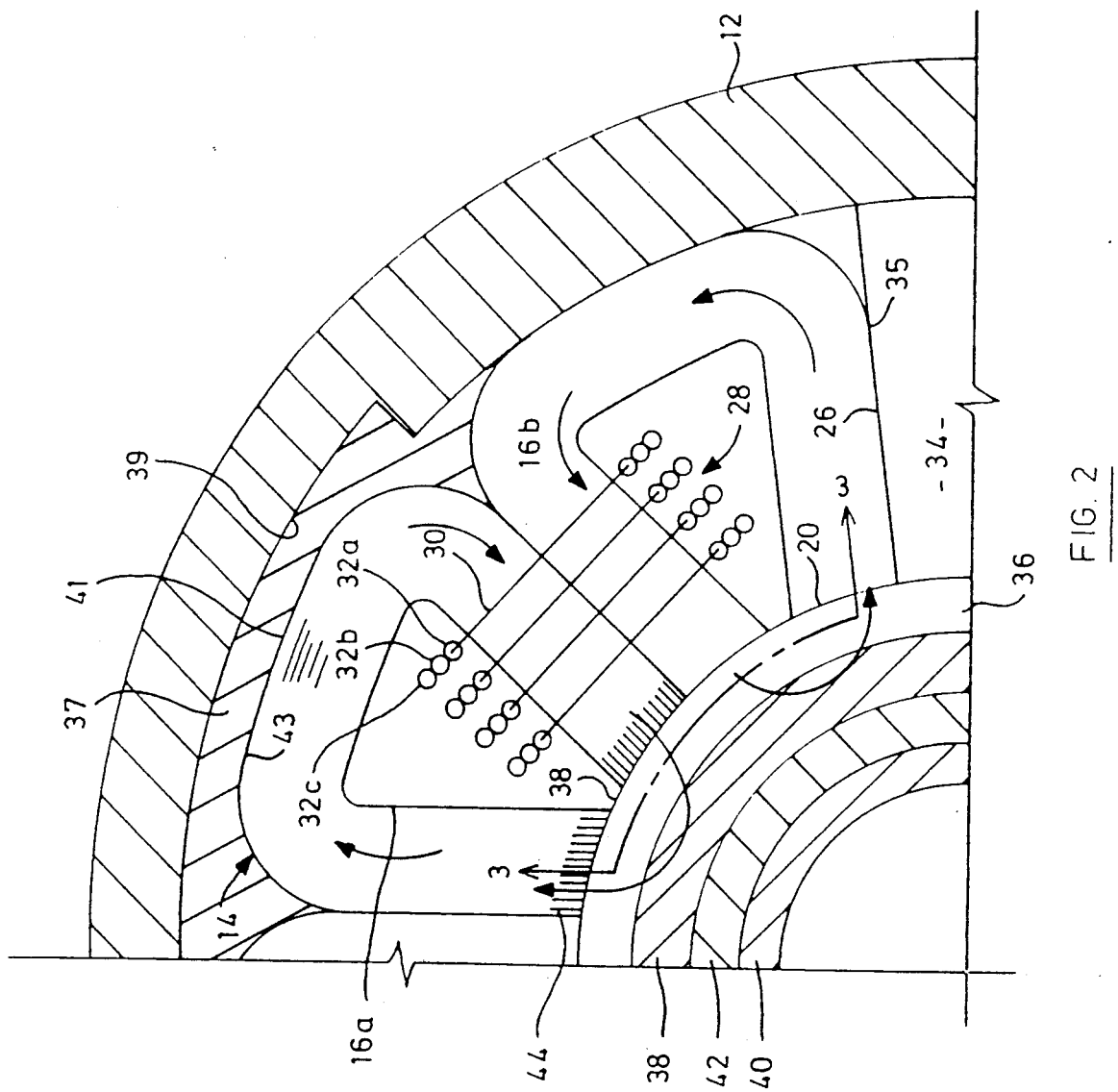
FIG. 2 is an enlarged view of a portion of the bearing shown in FIG. 1.
Figure 3:
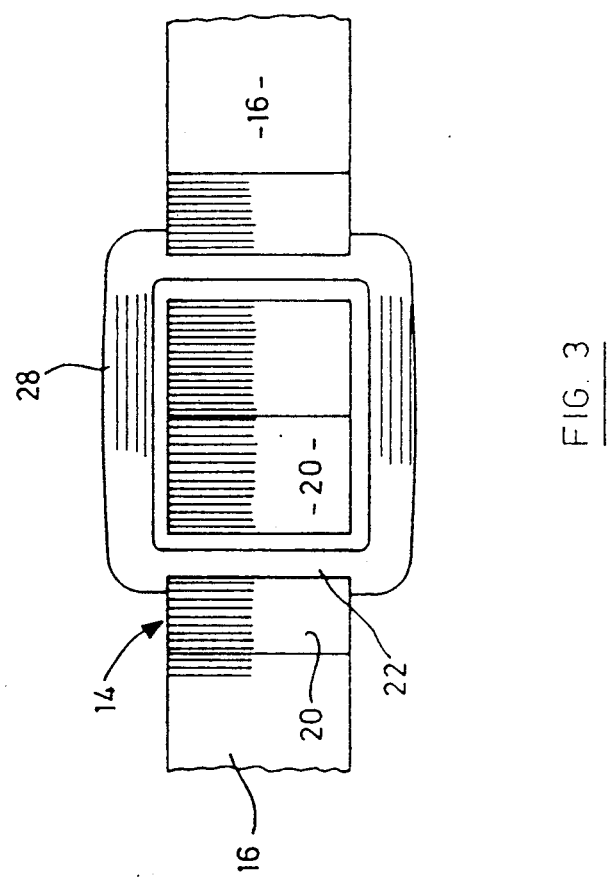
FIG. 3 is a view of the line 3—3 of FIG. 2.

Referring to FIGS. 1-3, a magnetic bearing includes a generally cylindrical housing 12 within which a plurality of individually formed pole pieces 14 are arranged in series about the circumference of the housing 12. Each of the pole pieces 14 includes a pair of radially extending limbs 16 interconnected by a bridging portion 18. The radially inner end of the pole piece 16 terminates in an arcuate surface 20 which defines a pole of the pole piece 14 and is separated from the adjacent pole of the same pole piece by a discontinuity 22. As can best be seen in FIG. 3, the discontinuity extends axially across the entire width of the pole piece 14.

Each of the pole pieces 14 is generally pie-shaped so that the limbs 16 diverge and define between them and the connecting portion 18 a triangular slot 24 that extends radially from the discontinuity 22. The radial disposition of the limbs 16 permits adjacent pole pieces to be nested about the circumference of the housing 12 with outer faces 26 of each limb abutting the corresponding outer face of the adjacent pole piece 14. A coil 28 encompasses abutting limbs 16 of selected ones of adjacent pole pieces 14 and, as may be seen more fully in FIG. 2, each coil consists of multiple turns of a conductor 30 arranged in layers indicated at 32a, 32b, 32c to supply the required magnetizing field to each of the limbs 16.

The construction and configuration of the pole pieces 14 and coils 28 are more fully described in co-pending application Ser. No. 495,943, filed on even date herewith and entitled MAGNETIC CORES OF ROTARY ELECTRICAL MACHINES, the contents of which are incorporated by reference. The pole pieces 14 are formed from a grain oriented tape wound about a triangular mandrel to define a triangular body. One apex of the body is removed to provide the arcuate surface 20 and the discontinuity 22. The resultant pole piece 14 has a substantially uniform cross section with laminations lying in planes parallel to the longitudinal axis of the bearing. This construction permits a magnetic material having a high permeability and high saturation level to be utilized to optimum benefit in the pole pieces 14.

The housing 12, pole pieces 14 and coils 28 constitute the stator of the magnetic bearing, with the surface 20 presenting a radially inner circumferential surface interrupted by the discontinuities 22. Separated from the surface by an air gap 36 is the radially outer surface of a laminated sleeve 38 rotatable with a shaft 40. The shaft 40 is separated from the sleeve 38 by a non-magnetic material on the shaft 40.

The shaft 40 rotates within and is supported by the stator, the radial position of the shaft 40 being controlled by the magnetic flux generated through the pole pieces 14 by the coils 28.

To control stray magnetic flux, pole pieces 14 are segregated into sets by wedge-shaped inserts 34 formed from a non-magnetic material such as 300 series stainless steel. Inserts 34 are arranged at diametrically opposed locations at the horizontal center line of the bearing 10. The radial flanks 35 of the inserts 34 diverge to be a close fit against the outer flanks 26 of the adjacent limbs 16. Inserts 34 thus act as a wedge to locate the pole pieces 14 within the housing 12, as well as a barrier to the flow of magnetic flux around the stator assembly formed by the housing 12, pole pieces 14 and coils 28.

Further control of the magnetic flux is provided by a magnetic guide 37 located in a circumferentially extending recess 39 of the housing 12. Magnetic guide 37 extends between pole pieces 14a,14b disposed to either side of the vertical center line of the bearing 10 and has a radially inner surface 41 conforming to the radially outer surface 43 of the pole pieces 14a,14b. The guide 37 is formed from a magnetic material such as mild steel which is machined to conform to the outer periphery of the pole pieces.

In operation, current is supplied to the coils 28 which generates a primary magnetic circuit, indicated by solid arrows in FIG. 2, in each of the pole pieces extending through the limb 16, across the air gap 36 and through the sleeve 38 to flow along the adjacent limb 16. Control of the current controls the magnetic flux density in the gap 36 and therefore the force exerted on the shaft 40 associated with the sleeve 38 to inhibit movement of the shaft 40 away from the desired axis of rotation. The absolute position of the shaft 40 can be monitored and the current to each of the coils 28 adjusted to ensure that shaft 40 is returned to the required datum.

In the embodiment illustrated in FIGS. 1-3, the shaft 40 rotates about a horizontal axis and therefore is subjected to an offset force caused by the weight of the shaft acting vertically downwardly. In order to support the shaft 40 in a central location, the current supplied to the coils 28 associated with the pole pieces 14a,14b positioned above the shaft on the vertical center line is greater than that supplied to the coils associated with the opposite pole pieces indicated at 14c,14d resulting in a greater flux density in the region of the poles 20 of pole pieces 14a,14b. This difference in magnetic flux density promotes a migration of magnetic flux, referred to as stray magnetic flux, from above the horizontal center line of the shaft 40 to below it.

The inserts 34 are effective to inhibit the migration of flux through the magnetic core and therefore prevent the migration of stray flux that acts to move the shaft 40 vertically downward. The thickness of inserts 34 is selected to inhibit a significant amount of the migration. The inserts 34 would have to be relatively thick to prevent virtually all flux migration which would reduce the pole area available to generate useful flux. As such, a compromise is reached that significantly reduces the flux flow without unduly encroaching on the pole area.

The difference in flux densities promotes the flow of flux which may cause a localized saturation in the bridging portion 18 of the pole pieces 14. Rather than try to inhibit these effects, the magnetic guides 37 are utilized to provide an increased cross sectional area of magnetic material for the bridging portion of pole pieces to cause the pole to saturate before any other part of the pole piece. This results in maximum flux density at the air gap.

Figure 4A:
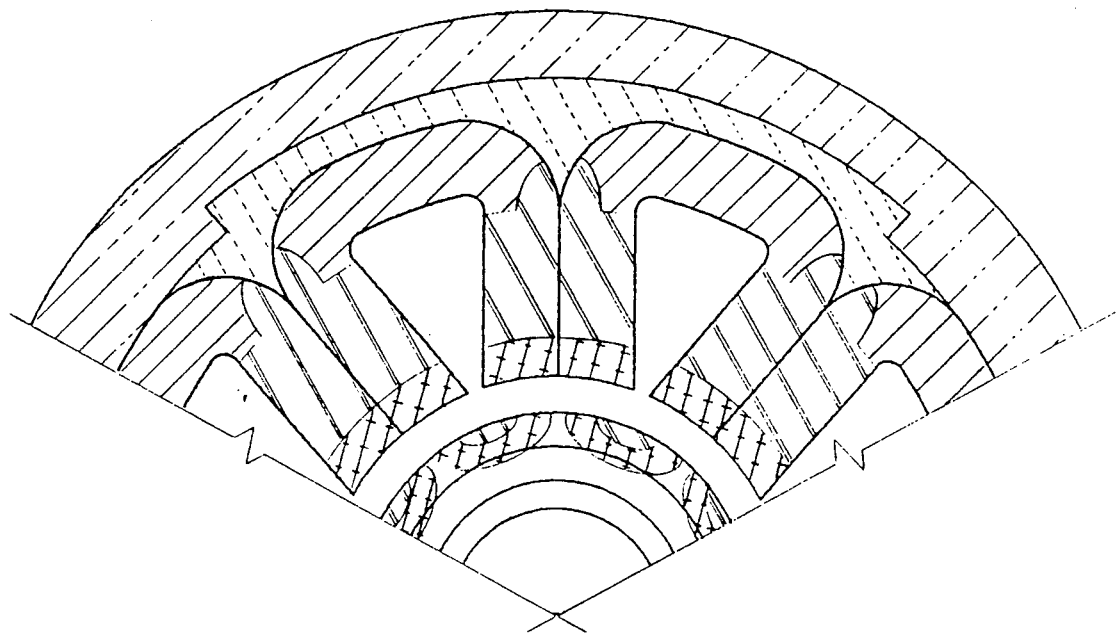
FIGS. 4a and 4b show the flux densities distribution in the bearing.
Figure 4A:
Figure 4A:
Figure 4A:
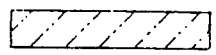
Figure 4B:
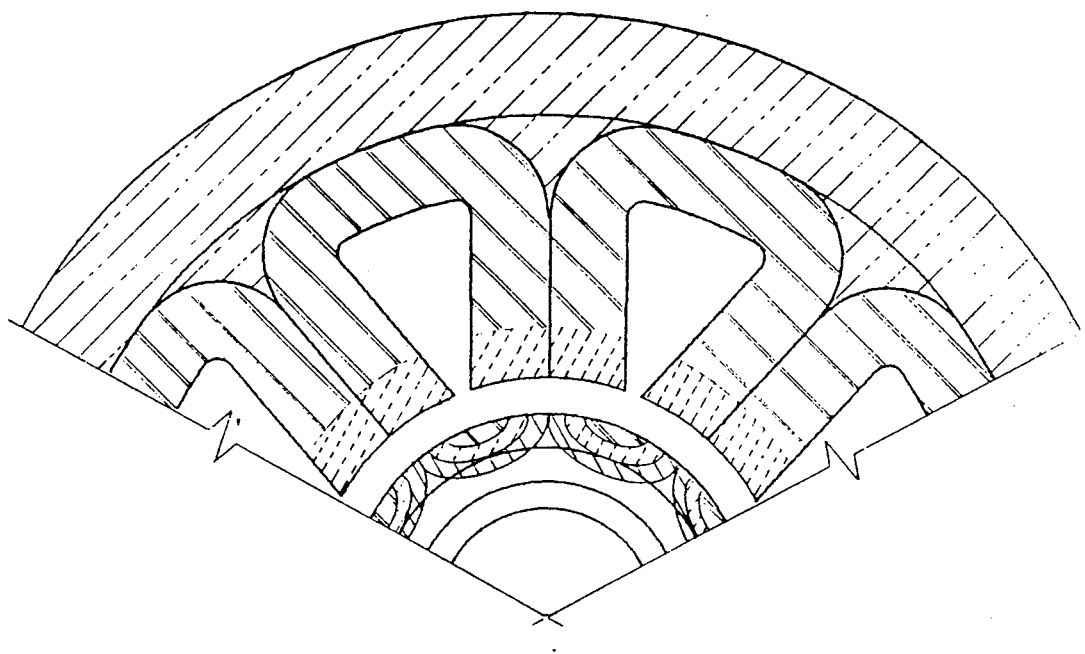
Figure 4B:
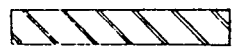
Figure 4B:
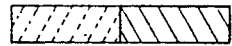
Figure 4B:
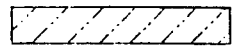

As can be seen from a comparison between FIGS. 4a and 4b, the guide 37 establishes an increased magnetic path across the connecting member 18 of pole piece 14a and into the limb 16b of pole piece 14a furthest away from the vertical center line. By contrast, as shown in FIG. 4b, the omission of flux guide 37 results in an increase in flux density in the bridging portion 18 and a reduction in flux density in the vertical limb 16a, indicating a reduction in the vertical bearing capacity.

Accordingly, it will be seen that the use of a magnetic guide at a specific location on the pole piece increases the bearing capacity in an effective yet simple manner and that the provision of the magnetic barriers inhibits the detrimental migration of flux. Moreover, it is possible to use discrete pole pieces of uniform cross section to take advantage of materials with enhanced magnetic capabilities and maintain a desirable magnetic flux distribution.

Whilst the bearing has been described with respect to a vertical steady state load due to the disposition of the shaft, it will be appreciated that the techniques are applicable to other configurations such as a vertical shaft having a steady state load due to, for example, a gear drive to or from the shaft.

The inserts 34 may be disposed in suitable locations depending upon the disposition of the shaft and the nature of the load and could divide the poles into three or more sets if appropriate. In certain applications, a single insert may be desirable to provide the required inhibition to the flow of stray flux. Similarly, the guide may be configured to establish beneficial magnetic circuits between adjacent pole pieces or across several pole pieces.

We claim:

1. A magnetic bearing comprising a stator assembly and a rotor assembly separated by an air gap, one of said assemblies having a plurality of discrete pole pieces, facing each other with opposed flanks, each having a pair of poles and being arranged in seriatim about the axis of rotation of said rotor assembly, coil means associated with the pole pieces to generate a magnetic flux in said pole pieces and establish a magnetic circuit through said pole pieces between said rotor and stator assemblies, at least one insert of non-magnetic material being interposed between opposed flanks of a pair of adjacent pole pieces thereby to inhibit migration of flux between said adjacent pole pieces.

2. A magnetic bearing according to claim 1 wherein a plurality of inserts are provided to divide the pole pieces into a plurality of sets, said inserts being interposed between adjacent pole pieces of different sets.

3. A bearing according to claim 2 wherein said inserts are uniformly distributed about said axis of rotation.

4. A bearing according to claim 3 wherein said inserts are arranged in diametrically opposed pairs.

5. A bearing according to claim 2 wherein each of said pole pieces is generally pie-shaped having a pair of radial extending limbs interconnected at the end distal to the air gap by a bridging member, said inserts being formed as wedges having radially extending flanks to abut the outer surfaces of adjacent pole pieces of different sets.

6. A bearing according to claim 5 wherein a coil encompasses selected pairs of abutting limbs of adjacent pole pieces and passes through radial slots formed between said limbs of each pole piece.

7. A bearing according to claim 6 wherein said pole pieces are each formed from laminations having abutting faces lying in planes parallel to the axis of rotation of said rotor.

8. A bearing according to claim 1 wherein magnetic guides extend at least partially around the periphery of at least one pole piece set at a location remote from the air gap, said magnetic guides increasing the area of the magnetic path at said location to inhibit the saturation of said pole piece at said location.

9. A bearing according to claim 7 wherein said pole pieces are individually formed and said magnetic guide extends between a plurality of said pole pieces and conforms to the periphery thereof.

10. A bearing according to claim 8 wherein said pole pieces are individually formed and abut adjacent ones of said pole pieces, said pole pieces being generally pie-shaped having a pair of radially extending limbs interconnected at the end distal to the air gap by a bridging member, said magnetic guide extending along and abutting said bridging member of respective ones of said pole pieces.

11. A bearing according to claim 10 wherein said pole pieces are located within a cylindrical housing in abutment with a peripheral wall thereof, a portion of said wall being removed to accomodate said guide.

12. A bearing according to claim 8 wherein said bearing is subjected to an offset load and said magnetic guide extends across the pole aligned with the line of action of said load.

13. A magnetic bearing comprising a stator assembly and a rotor assembly separated by an air gap, one of said assemblies having a plurality of discrete pole pieces arranged about the axis of rotation of said rotor assembly and each of which has a pair of poles located adjacent said air gap, coil means associated with the pole pieces to generate a magnetic flux in said pole pieces and establish a primary magnetic circuit through said pole pieces and between said rotor and stator assemblies, magnetic guides extending partially around the periphery of said pole pieces at a location remote from said poles, said guide increasing the area of the magnetic bearing path at said location to inhibit the saturation of said pole piece at said location by magnetic flux.

14. A bearing according to claim 13 wherein said magnetic guide extends between a plurality of said pole pieces and conforms to the periphery thereof.

15. A bearing according to claim 13 wherein said pole pieces abut adjacent ones of said pole pieces, said pole pieces being generally pie-shaped having a pair of radially extending limbs interconnected at the end distal to the air gap by a bridging member, said magnetic guide extending along and abutting said bridging member of respective ones of said pole pieces.

16. A bearing according to claim 15 wherein said pole pieces are located within a cylindrical housing in abutment with a peripheral wall thereof, a portion of said wall being removed to accomodate said guide.

17. A bearing according to claim 13 wherein said bearing is subjected to an offset load and said magnetic guide extends across the pole aligned with the line of action of said load.

18. A bearing according to claim 13 wherein said pole pieces have a uniform cross-sectional area between said poles.

19. A bearing according to claim 18 wherein said pole pieces are formed from laminations extending between said poles with abutting faces of said laminations lying in planes parallel to the axis of rotation of said rotor.

* * * * *